Dec. 30, 1930.  W. A. RUDDELL  1,787,421
BEETLE TRAP
Filed April 2, 1929  2 Sheets-Sheet 1
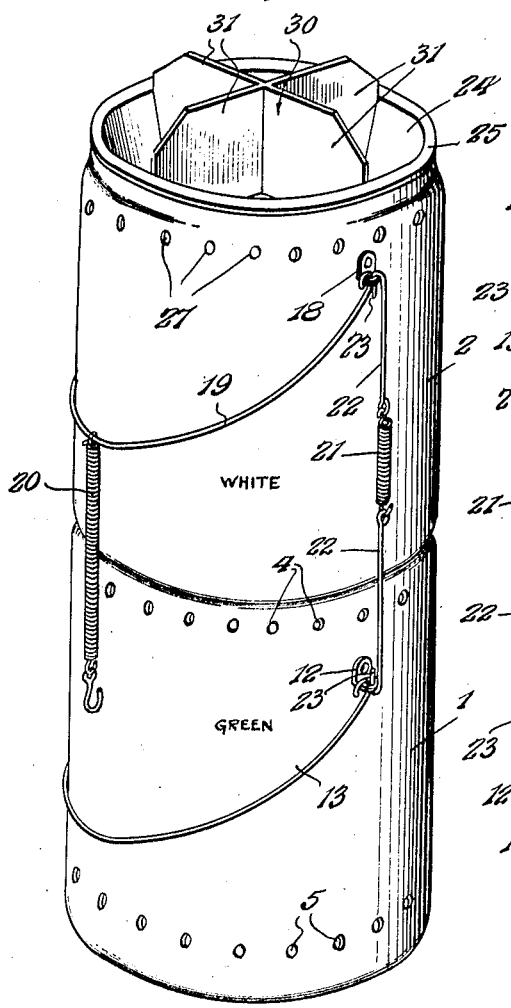
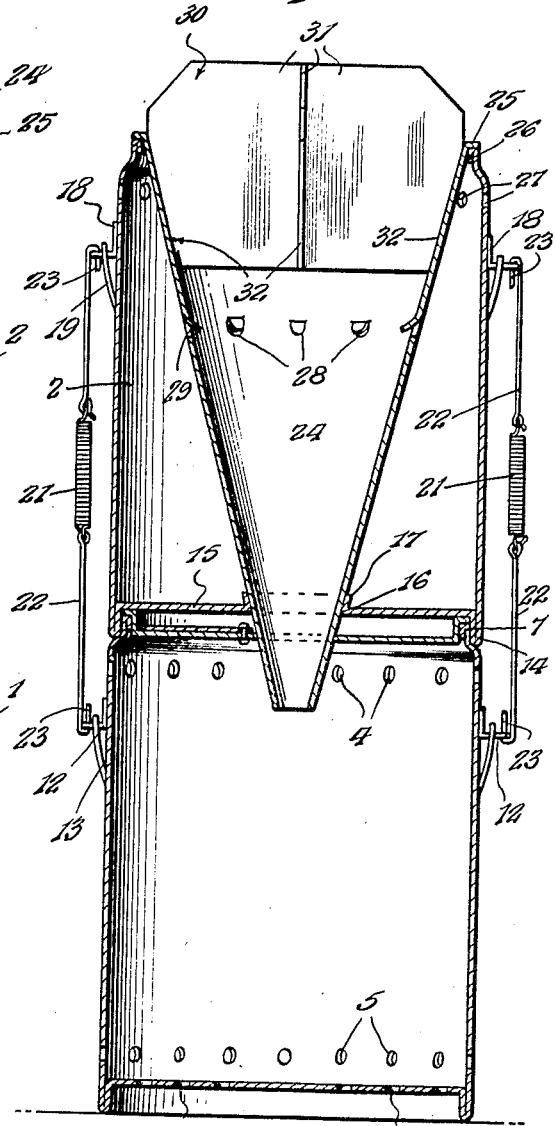
Inventor
W. A. Ruddell.
By Lacey & Lacey, Attorneys Dec. 30, 1930.  W. A. RUDDELL  1,787,421
BEETLE TRAP
Filed April 2, 1929  2 Sheets-Sheet 2
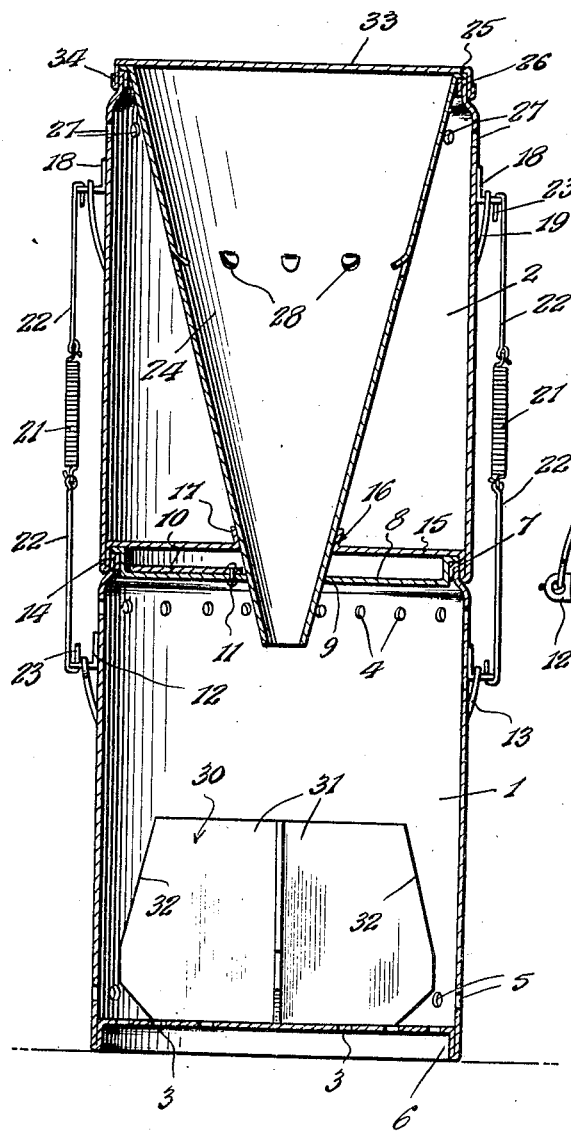
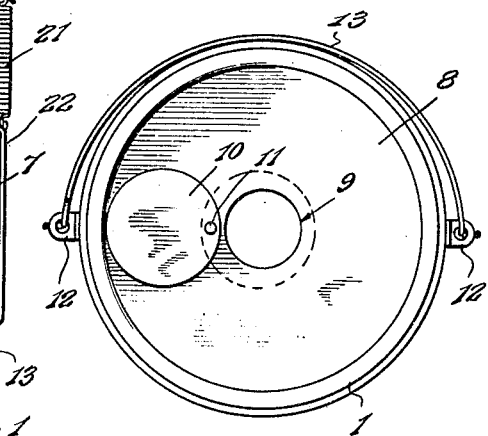
Inventor
W. A. Ruddell.
By Lacey & Lacey, Attorneys Patented Dec. 30, 1930

1,787,421

UNITED STATES PATENT OFFICE

WILLIAM A. RUDDELL, OF CAPE MAY POINT, NEW JERSEY, ASSIGNOR TO RIGHT IDEA JAP-BEETLE TRAP CO., OF NORFOLK, VIRGINIA

BEETLE TRAP

Application filed April 2, 1929. Serial No. 351,934.

This invention relates to insect traps and more particularly to a trap by means of which flying insects and particularly beetles, such as Japanese beetles, may be caught and destroyed.

One object of the invention is to provide a beetle trap into which beetles may readily pass but be prevented from leaving and to so form the entrance of the trap that beetles passing inwardly will be prevented from clogging the trap.

Another object of the invention is to so associate the entrance or conduit through which the beetles pass into the confining chamber or beetle container with the bait receptacle that odors from bait within the receptacle will attract the beetles to the trap and cause them to pass inwardly through the conduit into the confining chamber where they die and further to permit odors from dead beetles to escape from the confining chamber or beetle container without the odors of the dead beetles passing upwardly through the bait receptacle or inlet of the trap and tending to drive beetles away from the trap.

Another object of the invention is to provide a trap which may be painted or otherwise colored so that beetles will be attracted to the trap by its color as well as by the odors arising from the bait similar to the manner in which moths and other insects are attracted by a flame.

Another object of the invention is to so form the trap that when it is necessary to dispose of beetles which have accumulated in the confining chamber or beetle container the bait holder or receptacle mounted above the beetle container may be removed and the beetle passage or conduit carried with it without disturbing bait in the bait receptacle.

Another object of the invention is to allow the baffle which divides the upper end of the passageway or conduit and serves to direct beetles into the same to be removed from the conduit and stored in the beetle container and the open upper end of the conduit closed by a temporary lid removably applied to the upper end of the bait receptacle thereby allowing a number of the traps to be stacked one upon another when stored away or not in use.

Another object of the invention is to provide improved means for securing the bait receptacle in place upon the beetle container and to further provide a trap which may be either suspended from an overhead support, such as the limb of a tree or rest upon a suitable support.

The invention is illustrated in the accompanying drawings, wherein

Figure 1 is a perspective view of the improved trap,

Fig. 2 is a vertical sectional view through the trap,

Fig. 3 is a view similar to Fig. 2 showing the baffle placed in the beetle container and the upper end of the conduit closed by a removable lid, and Fig. 4 is a top plan view of the beetle container.

This improved beetle trap includes a confining chamber or beetle container 1 and a bait holder or receptacle 2 adapted to be set in place upon the container 1 and firmly but releasably secured thereon. The container 1 is preferably formed of metal and has its bottom provided with perforations 3 and the upper and lower portions of its walls perforated, as shown at 4 and 5, constituting ventilating openings through which the odors of dead beetles in the container may escape. It should also be noted that the bottom is elevated, as shown in Figs. 2 and 3, thereby providing a depending annular flange or rim 6 which will prevent the bottom of the container from contacting with a table or other support upon which the container may be placed and eliminate danger of the bottom of the container being damaged by water which might accumulate beneath it if it rested flat upon a support. The upper ends of the walls of the container are crimped inwardly to form a short neck 7 at its open upper end and into this neck is fitted a head 8 which is frictionally held in place similar to the manner in which hand tops are applied. An opening 9 is formed centrally in the head 8 and in order to allow the opening 9 to be closed when necessary, there has been provided a closure disk 10 which is pivotally secured against the outer face of the head by a rivet or equivalent fastener 11 so that the closure may be swung from an open position into position to close the opening, as indicated by dotted lines in Fig. 4. Ears 12 project from opposite sides of the container and engaged by a handle 13 which is normally swung downwardly, as shown in Fig. 1, but may be swung to a raised position in which it extends above the container when the container is to be carried to a place where beetles confined therein may be disposed of.

The bait holder or receptacle 2 is also preferably formed of metal and is provided with an annular flange 14 which extends downwardly about its bottom 15 and adapted to fit snugly about the neck 7 of the container 1. An opening 16 is provided centrally in the bottom of the bait receptacle and this opening is encircled by an upstanding bordering flange 17 which flares upwardly, as clearly shown in Figs. 2 and 3. By referring to these figures, it will be seen that when the bait receptacle is applied to the beetle container the opening 16 will be disposed directly above the opening 9. Ears 18 which are similar to the ears 12 are provided at opposite sides of the bait receptacle and carry a handle 19 similar to the handle 13 which is adapted to be swung unwardly above the bait receptacle so that the trap may be suspended from a tree limb or other overhead support. If so desired, a spring 20, similar to those used for bird cages, may be applied to the handle 19 and thereby allow the trap to be suspended from an overhead support and have swaying motion when in use. It is necessary to have the bait receptacle and beetle container firmly held in engagement with each other when the trap is in use, and I have, therefore, provided securing means at opposite sides of the trap each of which consists of a spring 21 disposed vertically and having its ends engaged with rods 22 which project upwardly and downwardly from the spring and at their ends terminate in hooks 23 to be engaged in the ears 12 and 18. It will thus be seen that the fasteners when applied will exert a pulling action and very firmly hold the bait receptacle and beetle container together but allow them to be released and separated when necessary.

In order to provide a passage for beetles so that they may pass into the beetle container or container 1, there has been provided a conduit 24 which tapers downwardly and is of such dimensions that when it is set in place within the bait receptacle and supported by an outstanding marginal flange 25 resting upon the reduced neck or mouth 26 of the bait receptacle the upper portion of the conduit will fit snugly into the mouth of the bait receptacle and completely fill the same and the lower portion of the conduit will pass through the alined openings 16 and 9 and completely fill the same and project into the upper portion of the beetle container 1. Openings 27 are formed adjacent the upper end of the bait receptacle so that fumes from bait placed in the receptacle may escape and attract beetles and other openings 28 are formed in the walls of the conduit intermediate its upper and lower ends so that part of the fumes may enter the conduit and to some extent suffocate the beetles as they pass inwardly through the conduit. In order to divide the upper portion of the conduit into a number of passages and also cause beetles to pass downwardly through the conduit, there has been provided a baffle 30 which is also preferably formed of metal and consists of metal plates or arms 31 which extend in diverging relation to each other. The free ends of the arms are formed with edge portions 32 which converge and conform to the incline of the side walls of the conduit and, therefore, when the baffle is set in place, as shown in Figs. 1 and 2, it will be prevented from moving inwardly beyond the position shown in these figures, and it will be supported with its upper portion projecting above the open upper end of the conduit. Therefore, beetles which are attracted to the trap by the smell of the bait and the colors of the bait receptacle and beetle container will strike the portions of the baffle which project upwardly and will drop into the conduit through which they will pass and into the beetle container. In view of the fact that the baffle divides the open upper end or mouth of the conduit into a number of passageways, the conduit will be prevented from becoming choked. The force of the blow received when the beetles strike the baffles will cause them to be dazed and they will drop downwardly through the conduit into the beetle container. Beetles which are only partially dazed may remain in the conduit for a short length of time but the fumes from the bait which enter the conduit through the openings 28 will cause the beetles to be partially or entirely asphyxiated and they will pass downwardly through the conduit into the beetle container. In view of the fact that the baffle terminates above the openings 28, rain which is deflected into the conduit by the baffle will be prevented from passing through the openings 28 into the bait receptacle.

When the beetle trap is in use, it is assembled as shown in Figs. 1 and 2 with bait of a suitable kind in the bait receptacle. The trap may be set in place upon a support or suspended from an overhead support, such as a tree limb. The fumes from the bait and the colors of the bait holder and beetle container will attract the beetles and cause them to fly towards the trap. When the beetles reach the trap, they strike the projecting upper portion of the baffle and are deflected downwardly so that they pass through the conduit and into the beetle container. In view of the fact that there is no communication between the bait holder and the beetle container and the beetle container is provided with ventilating openings in its sides odors from dead beetles in the container will be prevented from passing upwardly through the bait receptacle and causing the beetles to be driven away. After the trap has been in use a certain length of time, the beetle container becomes filled to such an extent that it is necessary to dispose of the beetles. When this is necessary, the hooks extending downwardly from the springs 21 are released from the ears 12 of the beetle container thereby releasing the beetle container and allowing it to be separated from the bait receptacle. As soon as the beetle container is detached from the bait receptacle the closure disk 10 is swung to a closed position in order to prevent beetles from escaping through the opening 9. Another beetle container may be set in place in place of the one removed and secured or the beetles can be dumped from the beetle container into a suitable receptacle or other place of disposal and the same container replaced. When the beetle container is detached, the conduit does not need to be removed and, therefore, bait in the receptacle will not be disturbed and also will not be liable to be spilled. By having the head 8 of the container frictionally held in place it can be removed and thereby allow beetles to be easily poured out of the container. When the trap is not in use, the baffle 30 is removed from the conduit and set into the beetle container, as shown in Fig. 3, and a cover or lid 33 applied in covering relation to the upper end of the conduit with its flange 34 fitting snugly about the reduced mouth of the bait receptacle. This prevents dirt from accumulating in the conduit and passing downwardly into the beetle container and also allows a number of traps to be stacked one upon another.

Having thus described the invention, I claim:

1. An insect trap comprising an insect container, a removable head for the upper end of said container formed with an opening, a bait receptacle seated upon said container and removable therefrom, means to releasably secure said receptacle in place upon said container, means to close the openings in the head of the upper end of said container when the receptacle is removed, a conduit extending vertically through said receptacle and having its lower end portion projecting through the bottom of the receptacle to extend into said container through the opening in the head thereof when the receptacle is in place upon the container, and means projecting above the upper end of said conduit for directing insects into the conduit.

2. An insect trap comprising an insect container, a removable head for the upper end of said container formed with an opening, a bait receptacle seated upon said container and removable therefrom, a conduit extending vertically through said receptacle and having its lower end projecting through the bottom of the receptacle to extend into said container through the opening in the head thereof when the receptacle is in place upon the container, a closure for the opening in said head carried thereby and adapted to be moved into position to close the opening when the receptacle is removed from said container, and means carried by the upper portion of said conduit for directing insects into the conduit.

3. An insect trap comprising a container, a bait receptacle above said container and open at its upper end, a conduit extending vertically in said bait receptacle and tapered towards its lower end, the upper end of said conduit fitting snugly within the upper end of said bait receptacle and the lower end portion of the conduit passing through the bottom of the bait receptacle and projecting into said container, and means for directing insects into said conduit removably seated in the upper portion thereof and tapered downwardly to fit snugly when in place and consisting of plates disposed transversely of each other and projecting upwardly from the conduit for contact by insects flying toward the trap from all directions.

4. An insect trap comprising an insect container open at its upper end, a removable head for the upper end of said container formed with an opening, a bait receptacle resting upon said container and open at its upper end, the bottom of said receptacle having an opening formed therein above the opening in the head of said container, a conduit disposed vertically in said receptacle with its upper end snugly fitting the open upper end of the receptacle and its lower portion extending through the openings in the bottom of the receptacle and head of said container and projecting into the container, and a baffle in the upper portion of said conduit projecting upwardly above the conduit to direct insects into the conduit.

5. An insect trap comprising an insect container open at its upper end, a removable head for the upper end of said container formed with an opening, a bait receptacle resting upon said container and open at its upper end, the bottom of said receptacle having an opening formed therein above the opening in the head of said container, a downwardly tapered conduit disposed vertically in said receptacle with its upper end snugly fitting the open upper end of the receptacle and its lower portion extending through the openings in the bottom of the receptacle and head of said container and projecting into the container, and a baffle for directing insects into said conduit fitting into the upper end thereof and including plates extending transversely in the conduit and dividing the upper portion thereof into a plurality of passages.

6. An insect trap comprising an insect container open at its upper end, a removable head for the upper end of said container formed with an opening, a bait receptacle resting upon said container and open at its upper end, the bottom of said receptacle having an opening formed therein above the opening in the head of said container, a downwardly tapered conduit disposed vertically in said receptacle with its upper end snugly fitting the open upper end of the receptacle and its lower portion extending through the openings in the bottom of the receptacle and head of said container and projecting into the container, a baffle dividing the upper portion of said conduit into a plurality of passages and projecting upwardly above the conduit to direct insects into the conduit, means to releasably secure said receptacle in place upon said container, said baffle being removable from said conduit and adapted to be placed within said container when stored, and a removable closure to cover the upper end of the conduit when the baffle is removed therefrom.

7. An insect trap comprising an insect container open at its upper end, a removable head for the upper end of said container formed with an opening, a bait receptacle resting upon said container and open at its upper end, the bottom of said receptacle having an opening formed therein above the opening in the head of said container, a downwardly tapered conduit disposed vertically in said receptacle with its upper end snugly fitting the open upper end of the receptacle and its lower portion extending through the openings in the bottom of the receptacle and head of said container and projecting into the container, ears projecting from the walls of said receptacle and container, means to retain the receptacle seated upon said container extending vertically and engaged with said ears, and a baffle for directing insects into said conduit.

8. An insect trap comprising an insect container open at its upper end, a removable head for the upper end of said container formed with an opening, a bait receptacle resting upon said container and open at its upper end, the bottom of said receptacle having an opening formed therein above the opening in the head of said container, a downwardly tapered conduit disposed vertically in said receptacle with its upper end snugly fitting the open upper end of the receptacle and its lower portion extending through the openings in the bottom of the receptacle and head of said container and projecting into the container, ears projecting from the walls of said receptacle and container, handles engaged with said ears, and means to releasably secure said receptacle upon said container including springs extending vertically, and rods engaged with the ends of said springs and formed with hooks engaged with said ears.

In testimony whereof I affix my signature.

WILLIAM A. RUDDELL. [L. S.]